United States Patent [19]
Kim et al.

[11] Patent Number: 5,432,696
[45] Date of Patent: Jul. 11, 1995

[54] APPARATUS FOR AND METHOD OF CONTROLLING A FAN UTILIZING A BRANCHING PHENOMEMON OCCURRING IN A SOLUTION OF A ONE PARAMETER FUNCTION

[75] Inventors: Jung H. Kim, Seoul; Hyung S. Kim, Kyungki; Byeong H. Lee, Kyungki; Young H. Roh, Kyungki; Hae Y. Chung, Seoul, all of Rep. of Korea

[73] Assignee: Goldstar Co., Ltd., Seoul, Rep. of Korea

[21] Appl. No.: 138,407

[22] Filed: Oct. 18, 1993

[30] Foreign Application Priority Data

Jun. 19, 1993 [KR] Rep. of Korea ............... 11233/1993

[51] Int. Cl.$^6$ .............................................. G05B 13/02
[52] U.S. Cl. ................................... 364/153; 388/907.5
[58] Field of Search .................... 364/153; 165/40, 122, 165/127, 11.1, 26; 62/160, 161, 115, 183, 184, 160; 236/94; 340/825.06; 416/39; 219/364; 318/283–285; 388/907–907.5

[56] References Cited

U.S. PATENT DOCUMENTS

| | | | |
|---|---|---|---|
| 3,935,522 | 1/1976 | Tsay | 318/345 |
| 4,642,441 | 2/1987 | Kenyon | 219/364 |
| 4,909,310 | 3/1990 | Umemura et al. | 165/40 |
| 4,914,925 | 4/1990 | Umemura et al. | 62/160 |
| 4,966,009 | 10/1990 | Ishii et al. | 62/160 |
| 5,041,825 | 8/1991 | Hart et al. | 340/825.06 |
| 5,050,394 | 9/1991 | Dudley et al. | 62/115 |
| 5,086,626 | 2/1992 | Iida | 62/184 |
| 5,230,606 | 7/1993 | Chin-Fu | 416/39 |

FOREIGN PATENT DOCUMENTS 63-246496  1/1989  Japan.
3197230  11/1991  Japan.

OTHER PUBLICATIONS

English abstract of Japanese Document 63-246496.
English abstract of Japanese Document 3-197230.

Primary Examiner—James P. Trammell
Attorney, Agent, or Firm—Ostrolenk, Faber, Gerb & Soffen

[57] ABSTRACT

An apparatus for and a method of controlling a fan, capable of generating a drive pattern of the fan by utilizing a branching phenomenon occurring in a solution of a parameter function. The method comprises the first step of determining the number of times (N) operating solutions of a function having one parameter until solutions periodically repeated are obtained from the function, an initial value of the function, a parameter of the function determined according to an operation mode selected by a user, the total number of solutions of the function, and the number of times (I) executing fan drive patterns for a predetermined fan drive time, the second step of inputting the initial value as a variable of the function, inputting the parameter, deriving a solution of the function, based on the inputted initial value and parameter, inputting the solution as the variable of the function, and repeatedly executing the above operation procedure of this step for the number of times (N), the third step of executing the operation procedure of the second step again, generating a fan driving pattern, and then repeatedly executing the above procedure of this step for the predetermined total number of solutions, and the fourth step of repeatedly executing the above procedures following the first step for the number of times (I).

3 Claims, 3 Drawing Sheets

APPARATUS FOR AND METHOD OF CONTROLLING A FAN UTILIZING A BRANCHING PHENOMEMON OCCURRING IN A SOLUTION OF A ONE PARAMETER FUNCTION

BACKGROUND OF THE INVENTION

1. Field of the Invention

The present invention relates to fans, and more particularly to an apparatus for and a method of controlling a fan.

2. Description of the Prior Art

Conventional fans are driven in a constant manner at a wind velocity and in a wind amount determined according to a mode selected by a user. As a result, the user may be uncomfortable after a long time use of the fan. In severe cases, the human body may be adversely affected. Consequently, the conventional fans have a disadvantage that an agreeable wind can not be obtained.

SUMMARY OF THE INVENTION

Therefore, an object of the invention is to provide an apparatus for and a method of controlling a fan, capable of generating a drive pattern of the fan by utilizing a branching phenomenon occurring in a solution of a parameter function and thus generating a wind amount and a wind velocity approximate to nature wind.

In accordance with one aspect, the present invention provides an apparatus for controlling driving of a fan comprising: a manipulation unit for selecting an operation mode of said fan by a user's manipulation; a drive pattern generating unit for generating a fan drive pattern corresponding to a wind amount and a wind velocity determined according to a mode signal fed from said manipulation unit; and a drive unit for driving a motor adapted to drive the fan, based on said drive pattern generated from said drive pattern generating unit to control the fan.

In accordance with another aspect, the present invention provides a method for controlling driving of a fan comprising the steps of: (a) predetermining the number of times (N) operating solutions of a function having one parameter until solutions periodically repeated are obtained from said function, an initial value of the function, a parameter of the function determined according to an operation mode selected by a user, the total number of solutions of the function repeatedly obtained for said determined parameter, and the number of times (I) executing fan drive patterns generated according to said solutions periodically obtained from the function for a predetermined fan drive time; (b) inputting said initial value of the function as a variable of the function, inputting the parameter determined according to said selected operation mode, deriving a solution of the function, based on the inputted initial value and parameter, inputting said solution of the function as the variable of the function to derive a solution of the function, and then repeatedly executing the above operation procedure of this step (b) for the number of times (N) predetermined at said step (a); (c) executing the operation procedure of said step (b) again after execution of the step (b), generating a fan driving pattern having a wind amount and a wind velocity corresponding to a solution of the function obtained in the operation procedure, and then repeatedly executing the above procedure of this step (c) for the predetermined total number of solutions; and (d) repeatedly executing the above procedures following the step (a) for the number of times (I) predetermined at the step (a) until the predetermined fan drive time elapses.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
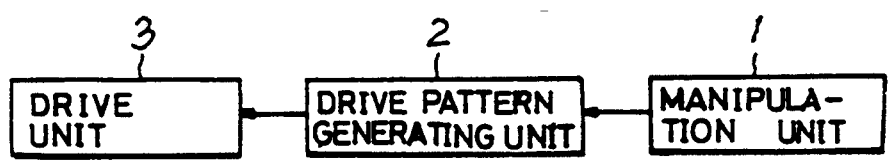
FIG. 1 is a block diagram illustrating an apparatus for controlling the driving of a fan in accordance with the present invention.

FIG. 1 is a block diagram illustrating an apparatus for controlling the driving of a fan in accordance with the present invention. As shown in FIG. 1, the control apparatus comprises a manipulation unit 1 for selecting an operation mode of the fan by a user's manipulation. To the manipulation unit 1, a drive pattern generating unit 2 is connected which generates a fan drive pattern corresponding to a wind amount and a wind velocity determined according to a mode signal fed via the manipulation unit 1 and outputs the generated drive pattern. A drive unit 3 is connected to the drive pattern generating unit 2. The drive unit 3 serves to drive a motor, based on the drive pattern, to control the fan.

Operation of the control apparatus having the above-mentioned arrangement will now be described in conjunction with FIGS. 1 to 5.

When an operation mode of the fan is selected via the manipulation unit 1, a mode signal indicative of the selected operation mode is generated and then applied to the drive pattern generating unit 2 which, in turn, generates a drive pattern corresponding to the selected mode.

Now, a procedure of generating the drive pattern in the drive pattern generating unit 2 in accordance with a first embodiment of the present invention will be described, in conjunction with an example in which a function $F(x)$ ($F(x) = \mu x(1-x)$) having one parameter is utilized.

Figure 2:
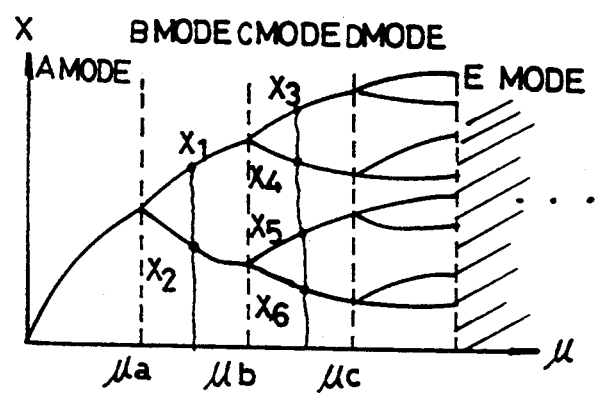
FIG. 2 is a diagram illustrating a branching phenomenon in solutions of a function utilized in a method for controlling a fan in accordance with a first embodiment of the present invention.
Figure 3:
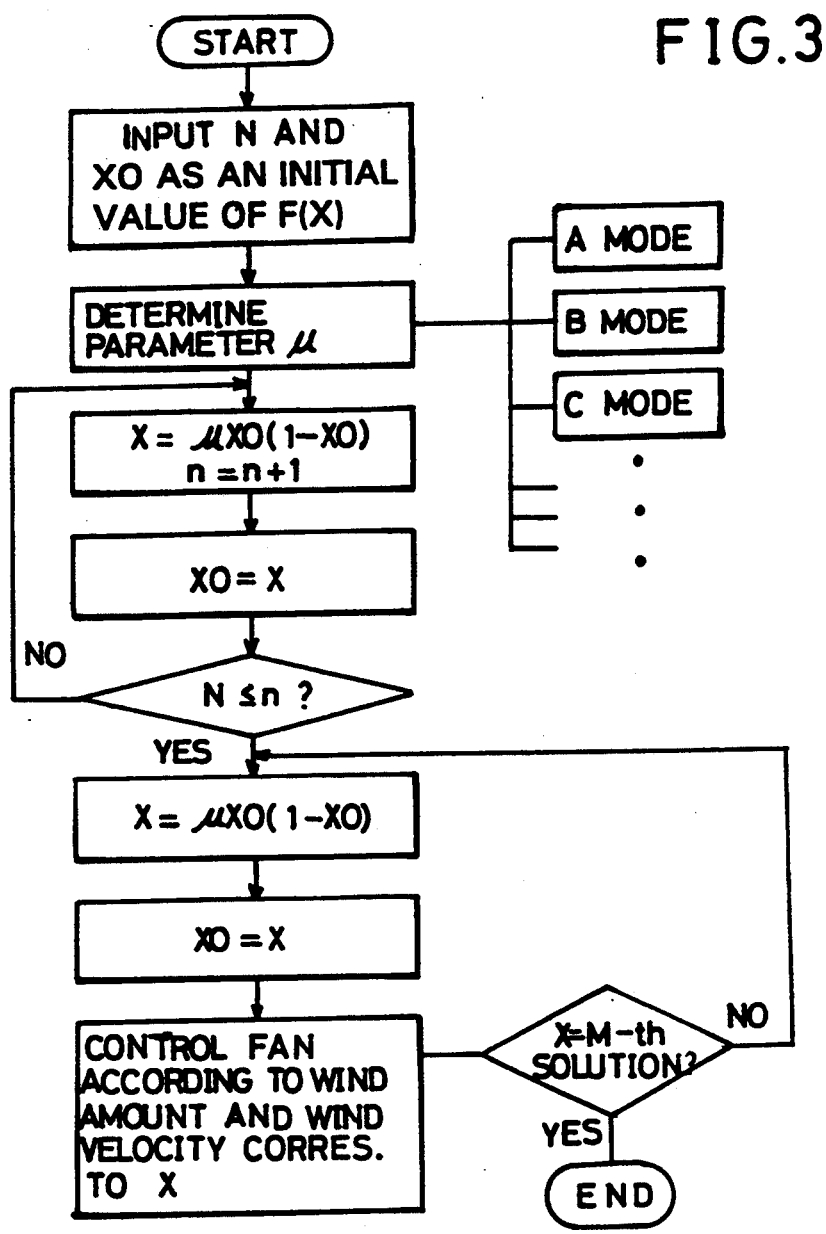
FIG. 3 is a flow chart illustrating the fan controlling method in accordance with the first embodiment of the present invention.

First, an initial value $X0$ of the function $F(x)$ is inputted as a variable of the function $F(x)$ so as to derive a solution $X1$ of the function $F(x)$. The solution $X1$ is then inputted as the variable of the function $F(x)$ so as to derive a solution of the function $F(x)$. As these operations are repeated, the function $F(x)$ have solutions of 2 values, 4 values or 8 values repeatedly derived depending on the parameter $\mu$, as shown in FIG. 2. For an optional parameter, each solution of the function $F(x)$ exhibits a branching phenomenon. For instance, with respect to an optional parameter μa, two solutions of the function F(x) are branched into four solutions, as shown in FIG. 2. For an optional parameter μb, four solutions are branched into eight solutions. As the parameter μ is continuously incremented, random solutions not beyond a certain boundary region are repeatedly obtained. This boundary region is called a chaos region.

Utilizing such a branch phenomenon of the function F(x), a generation of a fan drive pattern is achieved. When the user selects a desired operation mode, a parameter μ is determined which corresponds to the selected operation mode.

For instance, assuming that a B mode and an auto mode have been selected by the user, the parameter μ is determined to have a minimum value μmin of μa and a maximum value μmax of μb. The initial value X0 of the function F(x) is also determined. The number of times N operating solutions of the function F(x) until solutions periodically repeated are obtained from the function F(x) is also determined.

Thereafter, the parameter value μa is inputted as the parameter of the function F(x). Also, the initial value X0 of the function F(x) is inputted as a variable of the function F(x), thereby deriving a solution of the function F(x). The derived solution is then inputted as the variable of the function F(x) so as to derive a solution of the function F(x) again. As these operations are repeated until the predetermined number of operation times N, two solutions of the function F(x) are repeatedly obtained. These two solutions are then stored.

Then, the above-mentioned operation procedure is carried out under a condition that the parameter μ is incremented by a predetermined value Δμ. In this procedure, two solutions are also repeatedly obtained and then stored.

These procedures are repeated until the parameter μ corresponds to the maximum value μmax. From the stored solutions, those selected according to an ambient temperature are outputted. Accordingly, the fan is driven in a wind amount and a wind velocity corresponding to each of the solutions outputted.

Where a B-strong mode is selected by the user, solutions of the function F(x) are derived with respect to the maximum parameter value μmax so as to drive the fan in a wind amount and a wind velocity which correspond to each of the solutions.

In other words, the fan is initially driven in a wind amount and a wind velocity corresponding to a solution X1 of the function F(x) derived for the maximum parameter value μmax. Then, the fan is driven in a wind amount and a wind velocity corresponding to a solution X2 of the function F(x) obtained by inputting the solution X1 as a variable of the function F(x).

On the other hand, where the user selects a C mode, the fan is driven in a wind amount and a wind velocity corresponding to a solution of the function F(x) obtained with respect to the C mode. In other words, the fan is initially driven in a wind amount and a wind velocity corresponding to a solution X3 of the function F(x). Then, the fan is driven in a wind amount and a wind velocity corresponding to a solution X4 of the function F(x) obtained by inputting the solution X3 as a variable of the function F(x). The solution X4 is then inputted as the variable of the function F(x) so as to derive a solution X5 of the function F(x) which is, in turn, used to drive the fan in a wind amount and a wind velocity corresponding thereto. Subsequently, the fan is driven in a wind amount and a wind velocity corresponding to a solution X6 of the function F(x) obtained by inputting the solution X5 as the variable of the function F(x).

Such a drive pattern generated in the above-mentioned manner is applied to the drive unit 3 so that the fan is driven in a wind amount and a wind velocity corresponding to the generated drive pattern.

Next, a procedure of generating the fan drive pattern by utilizing the branch phenomenon occurring in solutions of a function G(x) in accordance with a second embodiment of the present invention will be described.

The function G(x) satisfies the following equation:

$$G(x) = K \cdot \mu x (1-x)$$

wherein, K represents a constant.

Figure 4:
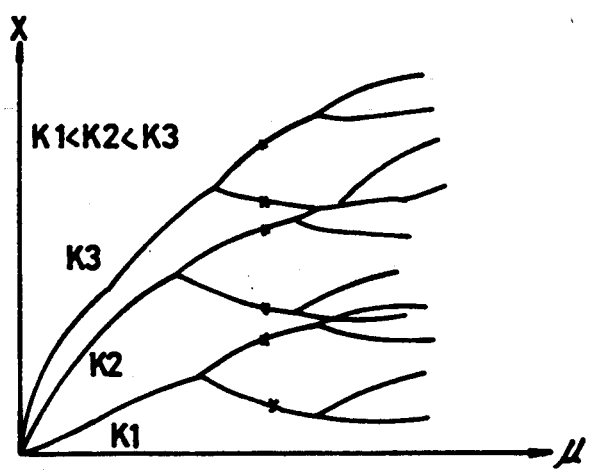
FIG. 4 is a diagram illustrating a branching phenomenon in solutions of a function utilized in a method for controlling a fan in accordance with a second embodiment of the present invention.

FIG. 4 is a diagram illustrating a solution branch in the function g(x). As shown in FIG. 4, the function G(x) has a solution varied in value depending on the constant K which is determined depending on the operation mode selected by the user.

Figure 5:
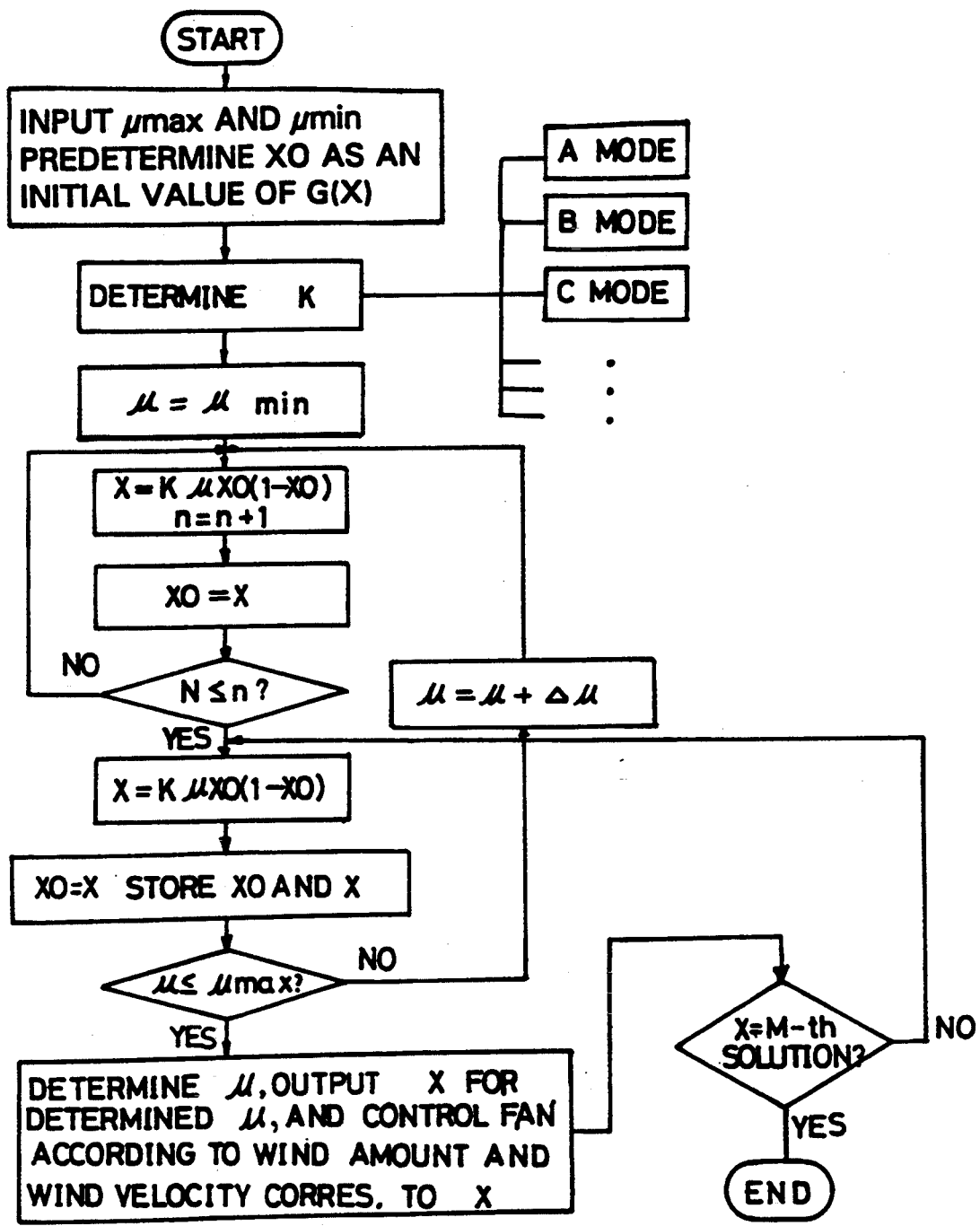
FIG. 5 is a flow chart illustrating the fan controlling method in accordance with the second embodiment of the present invention.

The procedure will now be described in detail, in conjunction with FIGS. 4 and 5. First, an initial value X0 is predetermined. The number of times N operating solutions of the function G(x) until solutions periodically repeated are obtained from the function G(x) is also predetermined. Then, a solution of the function G(x) is derived by inputting the initial value X0 as a variable of the function G(x).

The derived solution is then inputted as the variable of the function G(x) so as to derive a solution of the function G(x). As the above operation procedure is repeated until the predetermined number of times N operations, the function G(x) have solutions of 2 values, 4 values or 8 values repeatedly derived depending on the parameter μ, as shown in FIG. 4. For an optional parameter μa, two solutions of the function G(x) are branched into four solutions. For an optional parameter μb, four solutions are branched into eight solutions. As the parameter μ is continuously incremented, random solutions not beyond a certain boundary region are repeatedly obtained.

Utilizing such a branch phenomenon of the function G(x), a generation of a fan drive pattern is achieved. When the user selects a desired operation mode, a parameter μ is determined which corresponds to the selected operation mode.

For instance, assuming that a B mode and an auto mode have been selected by the user, the parameter μ is determined to have a minimum value μmin of μa and a maximum value μmax of μb. Also determined are the total number of solutions M (M=2) of the function G(x) determined by the parameter μ for the B mode selected by the user and the number of times I using drive patterns generated according to solutions periodically obtained from the function G(x) for a predetermined fan drive time.

Thereafter, the parameter value μa is inputted as the parameter of the function G(x). Also, the initial value X0 of the function G(x) is inputted as a variable of the function G(x), thereby deriving a solution of the function G(x). The derived solution is then inputted as the variable of the function G(x) so as to derive a solution of the function G(x) again. As these operations are repeated until the predetermined number of operation times N, two solutions X1 and X2 (M=2) of the function G(x) are repeatedly obtained. These two solutions X1 and X2 are then stored.

Then, the above operation procedure is carried out under a condition that the parameter $\mu$ is incremented by a predetermined increment $\Delta\mu$. In this procedure, two solutions are also repeatedly obtained and then stored.

These procedures are repeated until the parameter $\mu$ corresponds to the maximum value $\mu$max. From the stored solutions, those selected according to an ambient temperature are outputted. Accordingly, the fan is driven in a wind amount and a wind velocity corresponding to each of the solutions outputted.

Where a B-strong mode is selected by the user, solutions X1 and X2 of the function G(x) are derived with respect to the maximum parameter value $\mu$max so as to drive the fan in a wind amount and a wind velocity which correspond to each of the solutions.

In other words, the fan is initially driven in a wind amount and a wind velocity corresponding to the solution X1 of the function G(x) derived for the maximum parameter value $\mu$max. Then, the fan is driven in a wind amount and a wind velocity corresponding to the solution X2 of the function G(x) obtained by inputting the solution X1 as a variable of the function G(x).

On the other hand, where the user selects a C mode, the fan is driven in a wind amount and a wind velocity corresponding to a solution of the function G(x) obtained with respect to the C mode. In other words, the fan is initially driven in a wind amount and a wind velocity corresponding to a solution X3 of the function G(x). Then, the fan is driven in a wind amount and a wind velocity corresponding to a solution X4 of the function G(x) obtained by inputting the solution X3 as a variable of the function G(x). The solution X4 is then inputted as the variable of the function G(x) so as to derive a solution X5 of the function G(x) which is, in turn, used to drive the fan in a wind amount and a wind velocity corresponding thereto. Subsequently, the fan is driven in a wind amount and a wind velocity corresponding to a solution X6 of the function G(x) obtained by inputting the solution X5 as the variable of the function G(x).

When a D mode is selected by the user, the total number of solutions M of the function G(x) is 8. In this case, driving of the fan is controlled, based on 8 drive patterns respectively corresponding to the 8 solutions.

Where the user selects an E mode corresponding to the chaos region, random and unpredictable solutions not beyond a certain boundary value are obtained from the function G(x). Based on such random solutions, the fan is driven at short time intervals, thereby generating wind of random wind amount and wind velocity. Such wind amount and wind velocity in this mode are more approximate to those of nature wind, as compared to other modes, namely, the A mode, the B mode, the C mode and the D mode.

As apparent from the above description, the present invention provides an apparatus for and a method of controlling a fan, capable of generating a drive pattern of the fan by utilizing a branching phenomenon occurring solutions of a function having one parameter and thus generating a wind amount and a wind velocity approximate to nature wind. Accordingly, it is possible to not only obtain and keep a comfortable space condition, but also supply wind harmless to the human body.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling driving of a fan comprising:
    a manipulation unit for selecting an operation mode of said fan by a user's manipulation;
    a drive pattern generating unit for generating a fan drive pattern by utilizing a branching phenomenon occurring in a solution of a one parameter function corresponding to a wind amount and a wind velocity determined according to a mode signal fed from said manipulation unit; and
    a drive unit for driving a motor adapted to drive the fan, based on said drive pattern generated from said drive pattern generating unit to control the fan.

2. A method for controlling driving of a fan comprising the steps of:
    (a) predetermining the number of times (N) operating solutions of a function having one parameter until solutions periodically repeated are obtained from said function, an initial value of the function, a parameter of the function determined according to an operation mode selected by a user, the total number of solutions of the function repeatedly obtained for said determined parameter, and the number of times (I) executing fan drive patterns generated according to said solutions periodically obtained from the function for a predetermined fan drive time;
    (b) inputting said initial value of the function as a variable of the function, inputting the parameter determined according to said selected operation mode, deriving a solution of the function, based on the inputted initial value and parameter, inputting said solution of the function as the variable of the function to derive a solution of the function, and then repeatedly executing the above operation procedure of this step (b) for the number of times (N) predetermined at said step (a);
    (c) executing the operation procedure of said step (b) again after execution of the step (b), generating a fan driving pattern having a wind amount and a wind velocity corresponding to a solution of the function obtained in the operation procedure, and then repeatedly executing the above procedure of this step (c) for the predetermined total number of solutions; and
    (d) repeatedly executing the above procedures following the step (a) for the number of times (I) predetermined at the step (a) until the predetermined fan drive time elapses.

3. A method for controlling driving of a fan comprising the steps of:
    (a) predetermining the number of times (N) operating solutions of a function having one parameter until solutions periodically repeated are obtained from said function, an initial value of the function, a minimum value and a maximum value of a parameter of the function determined according to an operation mode selected by a user, the total number of solutions of the function repeatedly obtained for said determined parameter, arid the number of times (I) executing fan drive patterns generated according to said solutions periodically obtained from the function for a predetermined fan drive time;

(b) inputting said initial value of the function as a variable of the function, inputting said minimum parameter value determined according to said selected operation mode, deriving a solution of the function, based on the inputted initial value and minimum parameter value, inputting said solution of the function as the variable of the function to derive a solution of the function, and then repeatedly executing the above operation procedure of this step (b) for the number of times (N) predetermined at said step (a); and (c) executing the operation procedure of said step (b) again after execution of the step (b), sequentially storing solutions of the function obtained in the operation procedure, and then repeatedly executing the above procedures following said step (a) while sequentially incrementing a value of the parameter from the predetermined value by a predetermined increment;

(d) checking whether the value of the parameter has correspond to said predetermined maximum value after execution of said step (c) and outputting solutions stored at the step (c) according to an ambient temperature sensed;

(e) determining a wind amount and a wind velocity corresponding to each of the solutions outputted at said step (d) and outputting a fan drive pattern corresponding to said determined wind amount and wind velocity;

(f) repeatedly executing the above procedures following the step (b) for the predetermined total number of solutions; and (g) repeatedly executing the above procedures following the step (a) for the number of times (I) predetermined at the step (a).

* * * * *